Patented Aug. 2, 1927.

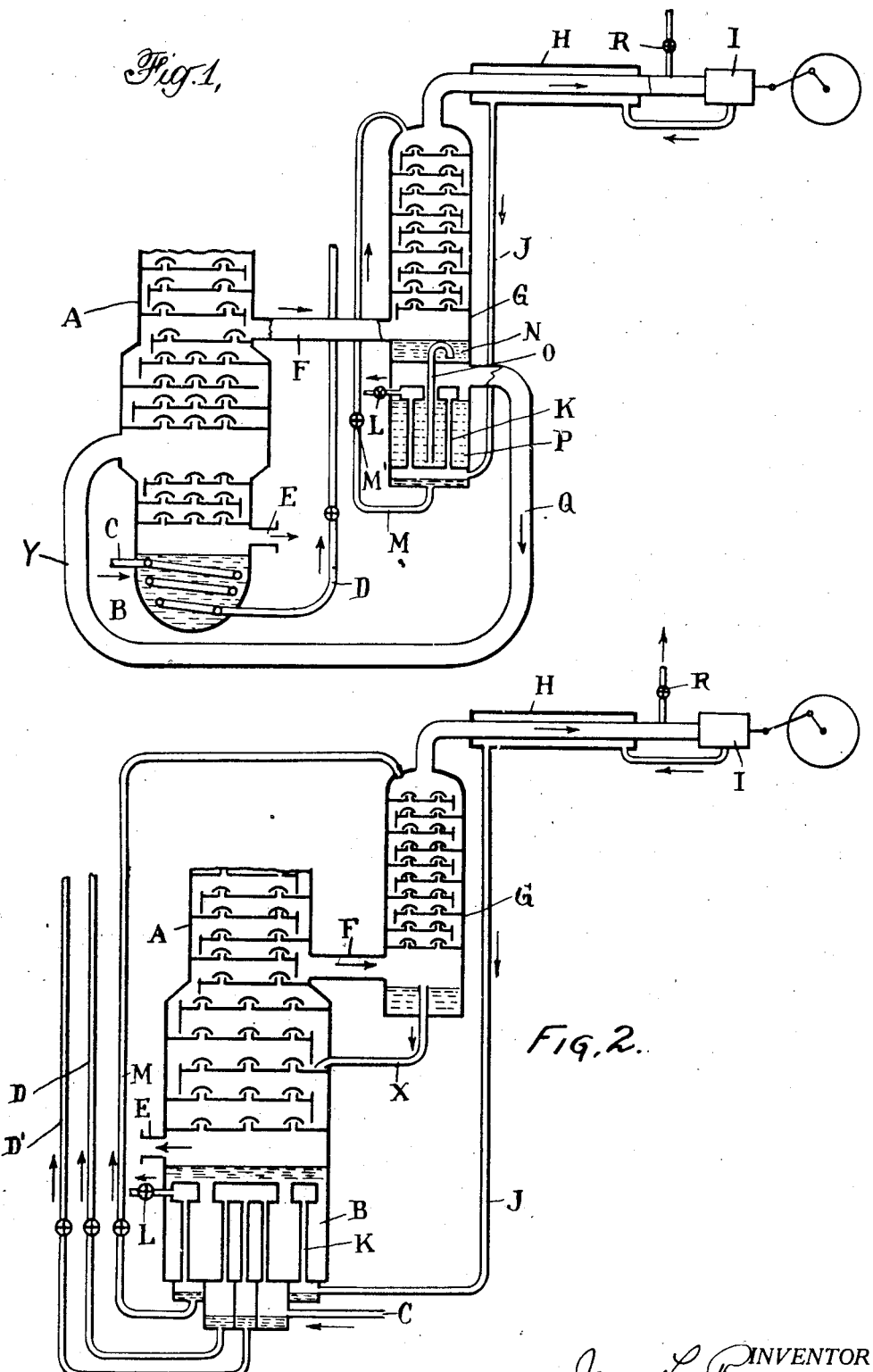

1,638,005

UNITED STATES PATENT OFFICE.

JEAN LE ROUGE, OF BOULOGNE, FRANCE, ASSIGNOR TO SOCIETE L'AIR LIQUIDE (SOCIETE ANONYME POUR L'ETUDE ET L'EXPLOITATION DES PROCEDES GEORGES CLAUDE), OF PARIS, FRANCE.

PROCESS OF SEPARATION OF THE ELEMENTS OF AIR OR OF OTHER GASEOUS MIXTURES BY LIQUEFACTION AND RECTIFICATION.

Application filed July 21, 1922, Serial No. 576,612, and in France August 12, 1921.

This invention relates to the separation of the constituents of gaseous mixtures where such constituents have differing boiling points, and is particularly adapted although not restricted to the recovery of argon, oxygen and nitrogen from the atmosphere.

In United States Letters Patent No. 1,068,219, a method is described which permits the recovery of a certain proportion of argon in addition to the separation of oxygen and nitrogen from air. As set forth in the patent mentioned, there is in the lower region of the usual rectification column an accumulation of vapors rich in argon when products of the liquefaction of air are treated therein. According to the patented method, the vapors are subjected to partial liquefaction by indirect contact with cold liquid at a higher level in the column. The liquefaction is accomplished with simultaneous rectification of the liquid formed because of the "backward return" thereof in direct contact with the entering vapors. As a result of this operation the oxygen in the vapors is liquefied and a gaseous residue rich in argon is withdrawn from the column.

This method does not permit the recovery of all of the argon in the air treated for the reason that only a portion of the accumulated vapors are subjected to the liquefying operation, the balance of the vapors passing upwardly through the rectification column and escaping with the effluent therefrom. Moreover, the liquefaction of the vapors rich in argon by indirect contact with the liquid in the column causes the vaporization of a corresponding quantity of this liquid which has the effect of interfering with the operation of the rectification column when the quantity of vapors rich in argon and consequently of the liquid vaporized reaches a certain value.

To avoid these difficulties it would be possible to replace the liquid undergoing rectification as a refrigerating medium by another liquid or corresponding cooling agent produced in any suitable manner and independently of the operation of the column. Nevertheless, the operation of the column would still be disturbed by withdrawal of the vapors rich in argon which form a considerable proportion of the vapors in the column. The vapors withdrawn would no longer rise through the column to accomplish their normal function in the rectification.

The object of the present invention is the provision of a method whereby the difficulties mentioned are overcome, thus permitting, for example, the recovery of substantially all of the argon contained in the air treated without interfering with the operation of the rectification column.

According to the method of the present invention, the vapors rich in argon are withdrawn from the column, but, at the same time, these vapors are replaced by an equivalent quantity of vapors having the same composition except for the quantity of argon or gas rich in argon which has been removed therefrom. As this argon or gas rich in argon constitutes a slight proportion only of the vapors withdrawn, the replacement in the column of an equivalent quantity of vapors in which the argon or gas rich in argon has been separated does not interfere materially with the proper operation of the column and, in fact, improves it since it is possible thereby to produce purer oxygen and nitrogen. Under these conditions any quantity of vapors rich in argon may be withdrawn from the column. If the quantity withdrawn is such that it contains practically all of the argon contained in the air treated and if these vapors are submitted to an operation which delivers the argon in a very pure state, it will be possible to avoid the losses of the earlier method.

In order that the invention may be readily understood, I have diagrammatically illustrated in the accompanying drawing the preferred forms of apparatus adapted to the accomplishment of the desired objects. In the drawing, Fig. 1 illustrates one form of apparatus; and Fig. 2 illustrates a slightly different form of apparatus.

Following the first mode of operation the vapors which are caused to rise in the primary column are the vapors which have been withdrawn and from which a part or all of the argon has been extracted. The vapors are introduced to the primary column at a convenient level where the vapors within the column have substantially the same composition as the entering vapors. The vapors withdrawn from the primary column are caused to travel outside the column through a cycle in which they are relieved as completely as possible of their argon content by a suitable physical operation and returned then to the column as hereinbefore stated near the same level from which they were withdrawn. The physical operation may be, for example, rectification with progressive and automatic purification which permits the obtaining of a gas, in this case argon, of a high degree of purity.

Referring to Fig. 1 of the drawing, the liquid resulting from the rectification of the vapors rich in argon is vaporized before returning to the column and this vaporization is preferably utilized for effecting rectification. The primary rectification column which may be of any suitable form is represented in this figure only by the lower part A including the liquid oxygen vaporizer B. The liquid oxygen produced in the usual manner by the rectification of liquids and vapors in the primary column is vaporized in the usual manner, for example, by the compressed cold air passing through the coil C, and the liquid formed by the liquefaction of the compressed air is delivered in the known manner by the pipe D to the upper part of the primary column A. The gaseous oxygen escapes at E. The vapors rich in argon accumulating in the lower trays of the column are withdrawn from the column A, for example, at F. These vapors are drawn through an auxiliary rectification column G and a temperature exchanger H by a compressor I. In the auxiliary column the vapors serve as a rectifying agent for the liquid flowing therethrough and in the exchanger H the vapors are warmed by indirect contact with preceding portions thereof which are recompressed by the compressor and returned through a pipe J passing meanwhile through the exchanger H where they are cooled by the heat interchange hereinbefore referred to. The cooled and compressed vapors are delivered to the interior of a liquefier-vaporizer consisting, for example, of a bundle of tubes K having a valve L through which any residual unliquefied gas may escape. The liquid formed in the tubes K is delivered by a pipe M, having a valve M', to the upper part of the column G. This liquid is rectified as hereinbefore stated by contact with the vapors rich in argon rising through the column and passing to the exchanger H. The descending liquid is thus enriched in oxygen while the argon and nitrogen content of the vapors increases. The liquid finally accumulates at N and escapes by a tube O forming a hydraulic seal to the vaporizer P where it surrounds the tubes K of the liquefier. The liquid in the vaporizer P is vaporized and the vapors are returned by a pipe Q into the primary or air liquefaction column A a little below the level at which the argon-enriched vapors are withdrawn and where the vapors within the column have substantially the same composition as the vapors returned thereto.

When the compressor I is started the gases forced up by the compressor and liquefied in K, and then vapourized in the column become as is well known richer and richer in the more volatile element which in this case is the argon mixed with a small quantity of nitrogen. When the gases issuing from the upper part of the column G and drawn in by the compressor contain the desired quantity of argon, a portion of this gas can be withdrawn through a cock R situated between the temperature exchanger H and the compressor I, and the quantity withdrawn may be such that it contains practically all the argon which was present in the air treated in the main column A. In this case the supply of the compressor must naturally be regulated accordingly. With regard to the nitrogen of which very small quantities may exist in the gas removed at F, its proportion is practically negligible relatively to the amount of gases rich in argon travelling in the cycle F, G, H, I, K, M, P, Q, Y and it cannot increase in this auxiliary circuit because the cock L permits of the elimination, in a constant manner, of the gas containing practically all the nitrogen entering the auxiliary column at the level F.

In this mode of operation it is apparent that the vapors returned by the pipe Q to the primary column should enter that column at Y under a pressure equal to that existing at the point of entrance to the column. It is possible to arrive easily at this result, for example, by vaporizing the liquid in the vaporizer P as shown under a hydrostatic head maintained by the depth of liquid coming from N such that the pressure of the gaseous atmosphere in P will be sufficient to ensure the desired pressure upon the vapors passing through Q to the column A.

According to another mode of operating the method, the gas which is caused to rise in the primary column is derived from liquid resulting from the rectification of the vapors rich in argon which liquid is returned directly to the primary rectification column. This liquid is introduced preferably on one of the trays directly below the level at which the vapors are withdrawn from the primary column. The liquid thus introduced descends with that flowing through the primary column and accumulates in the vaporizer at the foot of the column. These vapors rise in the column and rectify the descending liquid in such a manner that the vapors arrive at the level of withdrawal with the proper composition and continue upwardly in the primary column, replacing in the rectifying operation the vapors withdrawn. This mode of operation does not require careful regulation so that the vapors entering the column are at the pressure of the vapors therein as in the preceding example.

Referring to Fig. 2 of the drawing, it will be noted that the entering compressed air is liquefied in the vaporizer B in the known manner in two successive portions, furnishing two liquids, one rich in oxygen and the other rich in nitrogen, which liquids are delivered to the rectifying column by the pipes D, D'. The vapors rich in argon withdrawn at F are treated in the same manner as in the apparatus illustrated in Fig. 1, but the vapors returned by the compressor I are delivered by a pipe J to a bundle of tubes K, for example, of annular form immersed in the liquid rich in oxygen in the vaporizer B of the primary column. The liquid formed by this liquefaction with "backward return" in the tubes K is delivered by a pipe M to the upper part of the auxiliary rectification column G wherein it flows downwardly and is rectified by contact with the vapors rich in argon rising through the auxiliary column. The liquid accumulating as a result of this rectification in the lower part of the auxiliary column G is delivered by a pipe X onto one of the trays in the lower part of the primary column.

The results accomplished are substantially identical as in the preceding embodiment of the invention. Oxygen is separated from the vapors rich in argon in the auxiliary column and nitrogen is likewise separated in the tubes K and escapes through a valve L. The vapors traveling in the cycle of the auxiliary column are progressively enriched in argon, and a portion of these vapors corresponding substantially to the amount of argon present in the air originally treated in the primary column A may be withdrawn through a valve R. The liquid returned to the column through the pipe X furnishes a quantity of vapors substantially equal to the quantity withdrawn at F less the amount of argon or gas rich in argon withdrawn through the valve R. The operation of the primary rectification column is thus carried on without interference by reason of the withdrawal of vapors rich in argon.

It is to be understood that the methods as hereinbefore described may be varied within the scope of the accompanying claims without departing from the invention or sacrificing any of the advantages thereof.

I claim:—

1. A method of separating the constituents of a ternary gaseous mixture liquefying at low temperatures, which comprises subjecting the gaseous mixture to a primary rectification, withdrawing therefrom a gaseous mixture impoverished in the most volatile constituent, introducing this mixture in the gaseous phase to an auxiliary rectification, withdrawing the gaseous product of the auxiliary rectification, separating a portion of the most volatile constituent from the gaseous product, liquefying the remaining vapors and utilizing the liquid produced in the auxiliary rectification.

2. A method of separating the constituents of a gaseous mixture liquefying at low temperatures, which comprises subjecting the gaseous mixture to a primary rectification, withdrawing therefrom a gaseous mixture impoverished in one of the constituents, introducing this mixture in the gaseous phase to an auxiliary rectification, compressing the gaseous effluent of the auxiliary rectification, cooling it to separate another of the constituents from a liquid which is thereby impoverished in that constituent, and utilizing the impoverished liquid as a rectifying agent in the auxiliary rectification.

3. A method of separating the constituents of a gaseous mixture liquefying at low temperatures, which comprises subjecting the gaseous mixture to a primary rectification, withdrawing therefrom a gaseous mixture impoverished in one of the constituents, introducing this mixture in the gaseous phase to an auxiliary continuing rectification, compressing the gaseous effluent, cooling it to separate a liquid containing chiefly two of said constituents and a residue containing chiefly a third constituent, using the separated liquid in said auxiliary rectification and withdrawing portions of said gaseous effluent when it is sufficiently enriched in the desired constituent.

4. A method of recovering argon from air, which comprises subjecting the air to a primary rectification, withdrawing therefrom a gaseous mixture impoverished in nitrogen, introducing this mixture in the gaseous phase to a continuing auxiliary rectification, compressing the gaseous effluent, cooling it to separate a liquid containing chiefly argon and oxygen and a residue containing practically all of the nitrogen, using the last-named liquid in said auxiliary rectification and repeating the operation.

5. A method of separating the constituents of a gaseous mixture liquefying at low temperatures, which comprises subjecting the gaseous mixture to a primary rectification, withdrawing therefrom a gaseous mixture impoverished in one of the constituents, introducing this mixture in the gaseous phase to auxiliary rectification, thereby producing a liquid rich in the least volatile constituent and a gaseous fraction, compressing this gaseous fraction, subjecting it to indirect contact with the liquid product to evaporate the latter and to simultaneously separate by liquefaction from the gaseous fraction a residue containing the most volatile constituent and a liquid containing chiefly two of said constituents, returning this liquid for further auxiliary rectification and repeating the operation.

6. A method of recovering argon from air, which comprises subjecting a gaseous mixture to a primary rectification, withdrawing therefrom a gaseous mixture impoverished in nitrogen, introducing this mixture in the gaseous phase to an auxiliary rectification, thereby producing a liquid product rich in oxygen and a gaseous fraction, compressing this gaseous fraction, subjecting it to indirect contact with the liquid rich in oxygen to evaporate the latter and to simultaneously separate by liquefaction from the gaseous fraction a gaseous residue containing principally nitrogen and a liquid containing chiefly argon and oxygen, returning this liquid for further auxiliary rectification and repeating the operation.

7. A method of recovering argon from air, which comprises subjecting a gaseous mixture to a primary rectification, withdrawing therefrom a gaseous mixture impoverished in nitrogen, introducing the mixture in the gaseous phase to an auxiliary rectification by means of a liquid containing chiefly argon and oxygen, thereby producing a liquid product rich in oxygen and a gaseous fraction, withdrawing portions of the gaseous fraction when it is sufficiently enriched in argon, compressing the remainder of the fraction, subjecting it to indirect contact with the liquid rich in oxygen to evaporate the latter and to simultaneously separate by liquefaction from the gaseous fraction a residue containing principally nitrogen and a liquid containing chiefly argon and oxygen, and returning this liquid for further auxiliary rectification.

8. A method of recovering argon from air, which comprises subjecting the air to a primary rectification, withdrawing therefrom a gaseous mixture impoverished in nitrogen, introducing the mixture in the gaseous phase to an auxiliary rectification and subjecting the effluent from the auxiliary rectification to selective liquefaction to separate nitrogen therefrom, rejecting the nitrogen and returning the liquid formed for further auxiliary rectification.

9. A method of recovering argon from air, which comprises subjecting the air to a primary rectification, withdrawing therefrom a gaseous mixture impoverished in nitrogen, introducing this mixture in the gaseous phase to an auxiliary rectification and thereafter causing the effluent from the auxiliary rectification to travel in a closed circuit wherein it is successively subjected to selective liquefaction and to further auxiliary rectification.

10. A method of recovering argon from the atmosphere, which comprises subjecting air to a primary rectification, withdrawing therefrom a gaseous mixture impoverished in nitrogen, introducing this mixture in the gaseous phase to a cyclic operation including an auxiliary rectification to separate a liquid enriched in oxygen with recompression and selective liquefaction of the gaseous effluent from the auxiliary rectification to separate residual gaseous nitrogen, the remainder of said gaseous effluent being returned for further auxiliary rectification and thereby progressively enriched in argon.

11. A method of recovering argon from air which comprises subjecting the air to liquefaction and a primary rectification to produce a gaseous mixture enriched in argon, withdrawing this gaseous mixture, subjecting it to an auxiliary rectification in contact with a liquid rich in argon, withdrawing the gaseous effluent from the second rectification subjecting it to recompression and selective liquefaction to separate residual gaseous nitrogen and to produce a liquid suitable for use in the auxiliary rectification and returning the equivalent of the gaseous mixture withdrawn from the primary rectification thereto substantially free from argon.

12. A method of recovering argon from air which comprises subjecting the air to liquefaction and a primary rectification to produce a gaseous mixture enriched in argon, withdrawing this gaseous mixture, subjecting it to an auxiliary rectification in contact with a liquid rich in argon, withdrawing the gaseous effluent from the auxiliary rectification and subjecting it to recompression and selective liquefaction to separate residual gaseous nitrogen and to produce a liquid suitable for use in the auxiliary rectification, evaporating the liquid product of the auxiliary rectification by the selective liquefaction of the compressed gaseous effluent, and returning the resulting vapors for utilization in the first rectification.

13. A method of recovering argon from air which comprises subjecting the air to liquefaction and a primary rectification to produce a gaseous mixture enriched in argon, withdrawing this gaseous mixture, subjecting it to an auxiliary rectification in contact with a liquid rich in argon, withdrawing the gaseous effluent from the auxiliary rectification and subjecting it to recompression and selective liquefaction to separate residual gaseous nitrogen and to produce a liquid suitable for use in the auxiliary rectification, and returning the liquid product of the auxiliary rectification for utilization in the first rectification.

14. A method of separation of the constituents of air and other gaseous mixtures by liquefaction and rectification permitting extraction of a gas very rich in one of the constituents having an intermediate boiling point, for example, a gas very rich in argon in the case of air, consisting of withdrawing the vapors rich in that constituent from a primary rectification treating the vapors in a thermally remote auxiliary rectification for enrichment in one of the constituents and replacing the vapors withdrawn with a quantity of vapors equal to that withdrawn and of the same composition except for the quantity of argon or gas rich in argon extracted therefrom during the treatment.

15. A method of separation of the constituents of air and other gaseous mixtures by liquefaction and rectification permitting extraction of a gas very rich in one of the constituents having an intermediate boiling point, for example, a gas very rich in argon in the case of air, consisting in withdrawing the vapors rich in that constituent from a primary rectification and treating them by a thermally remote auxiliary rectification for enrichment in gaseous argon while introducing into the primary rectification near the level of withdrawal of the vapors the same vapors which have been withdrawn and separated from part or practically all of the argon content.

16. A method of separation of the constituents of air and other gaseous mixtures by liquefaction and rectification permitting extraction of a gas very rich in one of the constituents having an intermediate boiling point, for example, a gas very rich in argon in the case of air, consisting in withdrawing the vapors rich in that constituent from a primary rectification and treating them by a thermally remote auxiliary rectification for enrichment in gaseous argon while using in the primary rectification vapors resulting from the vaporization of liquid produced by rectification of the vapors withdrawn.

17. The method as in claim 14, consisting in introducing to the primary rectification preferably at a level below that at which the vapors are withdrawn the liquid formed by the rectification of the vapors withdrawn, vaporizing this liquid and utilizing the vapors in the primary rectification.

18. A method of separation of the constituents of air and other gaseous mixtures by liquefaction and rectification permitting extraction of a gas very rich in one of the constituents having an intermediate boiling point, for example, a gas very rich in argon in the case of air, consisting of withdrawing the vapors rich in that constituent from a primary rectification, treating the vapors in a thermally remote auxiliary rectification for enrichment in one of the constituents and replacing in the primary rectification the equivalent of the vapors withdrawn substantially free from the constituent extracted.

19. A method of separating the constituents of ternary gaseous mixtures, which comprises partly separating the gaseous mixture to obtain another gaseous mixture enriched in the two less volatile constituents, introducing this enriched gaseous mixture in the gaseous phase to a rectification, recompressing and cooling the gaseous effluent from the rectification and utilizing the liquid thereby produced in the rectification of further quantities of the gaseous mixture introduced.

20. A method of separating the constituents of ternary gaseous mixtures, which comprises forming a gaseous mixture impoverished in one of said constituents by a primary rectification, withdrawing the impoverished mixture in the gaseous phase from an intermediate point in the primary rectification, subjecting it to a thermally remote auxiliary rectification to further enrich the mixture in another constituent and returning the equivalent of the gaseous mixture withdrawn from the primary rectification thereto substantially free from the constituent extracted at a point adjacent to the point of withdrawal.

21. A method of separating the constituents of ternary gaseous mixtures, which comprises producing a mixture in the gaseous phase impoverished in one of the constituents by a primary rectification, withdrawing the gaseous mixture, introducing it to an auxiliary rectification, recompressing and cooling the gaseous effluent from the auxiliary rectification to further enrich the mixture in another constituent and returning the equivalent of the gaseous mixture withdrawn from the primary rectification thereto substantially free from the constituent extracted at a point adjacent to the point of withdrawal.

22. A method for the separation of a mixture of gases such as air into its constituents, which consists in selectively liquefying a portion of the mixture in a condenser located at the foot of a rectification column followed by non-selective liquefaction of the remainder in a condenser also located at the foot of the rectification column and withdrawing at a selected level in the column some of the vapor undergoing rectification as it reaches that level.

In testimony whereof I affix my signature.

JEAN LE ROUGE.